US012461737B2

(12) United States Patent
Tomokuni et al.

(10) Patent No.: US 12,461,737 B2
(45) Date of Patent: Nov. 4, 2025

(54) PROGRAM MANAGEMENT DEVICE, PROGRAM MANAGEMENT METHOD, AND RECORDING MEDIUM

(71) Applicant: HONDA MOTOR CO., LTD., Tokyo (JP)

(72) Inventors: Satomi Tomokuni, Tokyo (JP); Tomonori Yokota, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 371 days.

(21) Appl. No.: 18/157,118

(22) Filed: Jan. 20, 2023

(65) Prior Publication Data
US 2023/0259354 A1    Aug. 17, 2023

(30) Foreign Application Priority Data

Feb. 15, 2022 (JP) .................................. 2022-021063
Aug. 31, 2022 (JP) .................................. 2022-137519

(51) Int. Cl.
G06F 9/44 (2018.01)
G06F 8/65 (2018.01)

(52) U.S. Cl.
CPC ....................................... *G06F 8/65* (2013.01)

(58) Field of Classification Search
None
See application file for complete search history.

(56) References Cited

U.S. PATENT DOCUMENTS

| 11,347,495 | B2* | 5/2022 | Hayashidera | ............. G06F 8/65 |
| 2019/0243635 | A1* | 8/2019 | Van Sickle | ............. G06F 8/654 |
| 2019/0258476 | A1* | 8/2019 | Miyazaki | ................ G06F 8/658 |
| 2020/0089487 | A1* | 3/2020 | Ramic | ....................... G06F 8/65 |

(Continued)

FOREIGN PATENT DOCUMENTS

| JP | 2004-094832 A | 3/2004 |
| JP | 2007-133601 A | 5/2007 |

(Continued)

OTHER PUBLICATIONS

WO 2019221118, English text (Year: 2019).*

(Continued)

*Primary Examiner* — Insun Kang
(74) *Attorney, Agent, or Firm* — Rankin, Hill & Clark LLP

(57) ABSTRACT

A program management device includes a communication unit that communicates with an external device that is present outside a vehicle, a first storage unit having an irrespective program storage area where an irrespective program that is irrespective of control of the vehicle is stored, a second storage unit provided independently of the first storage unit, and an update processing unit configured to store in the second storage unit an irrespective update program received by the communication unit, the irrespective update program being used to update the irrespective program. The update processing unit executes processing of storing, in the second storage unit, the irrespective program stored in the irrespective program storage area, and subsequently executes processing of storing the irrespective program in the irrespective program storage area based on the irrespective update program stored in the second storage unit.

8 Claims, 7 Drawing Sheets

(56) References Cited

U.S. PATENT DOCUMENTS

| | | | |
|---|---|---|---|
| 2022/0121440 A1* | 4/2022 | Tamano | G06F 8/65 |
| 2022/0197627 A1* | 6/2022 | Yamaguchi | B60W 40/10 |
| 2022/0276851 A1 | 9/2022 | Nakahara et al. | |
| 2023/0254374 A1* | 8/2023 | Harata | G07C 5/008 |
| | | | 711/154 |
| 2023/0401052 A1* | 12/2023 | Zhou | H04L 67/34 |

FOREIGN PATENT DOCUMENTS

| | | |
|---|---|---|
| JP | 2019-144669 A | 8/2019 |
| JP | 2020-027666 A | 2/2020 |
| JP | 2020-038585 A | 3/2020 |
| JP | 2021-128362 A | 9/2021 |
| WO | 2021/024792 A1 | 2/2021 |

OTHER PUBLICATIONS

JP 2021144635, English text (Year: 2021).*
Japanese Office Action from Corresponding Japanese Application No. 2022-137519, issued Apr. 2, 2024, with English translation, 11 pages.
Japanese Office Action dated Oct. 29, 2024 issued in corresponding Japanese application No. 2022-137519; English machine translation included (7 pages).

* cited by examiner

PROGRAM MANAGEMENT DEVICE, PROGRAM MANAGEMENT METHOD, AND RECORDING MEDIUM

INCORPORATION BY REFERENCE

The present application claims priority under 35 U.S.C. § 119 to Japanese Patent Application No. 2022-021063 filed on Feb. 15, 2022 and Japanese Patent Application No. 2022-137519 filed on Aug. 31, 2022. The content of the applications is incorporated herein by reference in its entirety.

BACKGROUND OF THE INVENTION

Field of the Invention

The present invention relates to a program management device, a program management method, and a recording medium.

Description of the Related Art

In recent years, the functions of software that controls vehicles have been enhanced for the purpose of improving traffic safety and reducing $CO_2$ emission. Techniques have also been proposed to update programs that are executed by an electronic control unit (ECU) mounted on vehicles. For example, Japanese Patent Laid-Open No. 2019-144669 discloses the configuration in which a storage unit for storing programs includes a vehicle control program storage area for storing a control program and a second program storage area for storing an update program which is an updated version of the control program. According to the configuration, the update program can be stored in the storage unit even during execution of the control program, which can reduce the restriction of timing for program update.

SUMMARY OF THE INVENTION

Japanese Patent Laid-Open No. 2019-144669 discloses the configuration in which a plurality of storage areas are provided for storing programs so that any one of the storage areas can be selected and used. This configuration requires a large storage capacity as compared with the size of the programs.

The present invention has been made in view of such background circumstances, and it is an object of the present invention to reduce the restriction of timing for updating the programs for use in a vehicle, by a method less likely to cause a substantial increase in capacity of the storage area.

One aspect for achieving the above object relates to a program management device. The program management device includes a communication unit that communicates with an external device that is present outside a vehicle, a first storage unit having an irrespective program storage area where an irrespective program that is irrespective of control of the vehicle is stored, a second storage unit provided independently of the first storage unit, and an update processing unit configured to store in the second storage unit an irrespective update program received by the communication unit, the irrespective update program being used to update the irrespective program. The update processing unit executes processing of storing, in the second storage unit, the irrespective program stored in the irrespective program storage area, and subsequently executes processing of storing the irrespective program in the irrespective program storage area based on the irrespective update program.

The above configuration can reduce the restriction of timing for updating the irrespective program.

DETAILED DESCRIPTION OF THE PREFERRED EMBODIMENT

Figure 1:
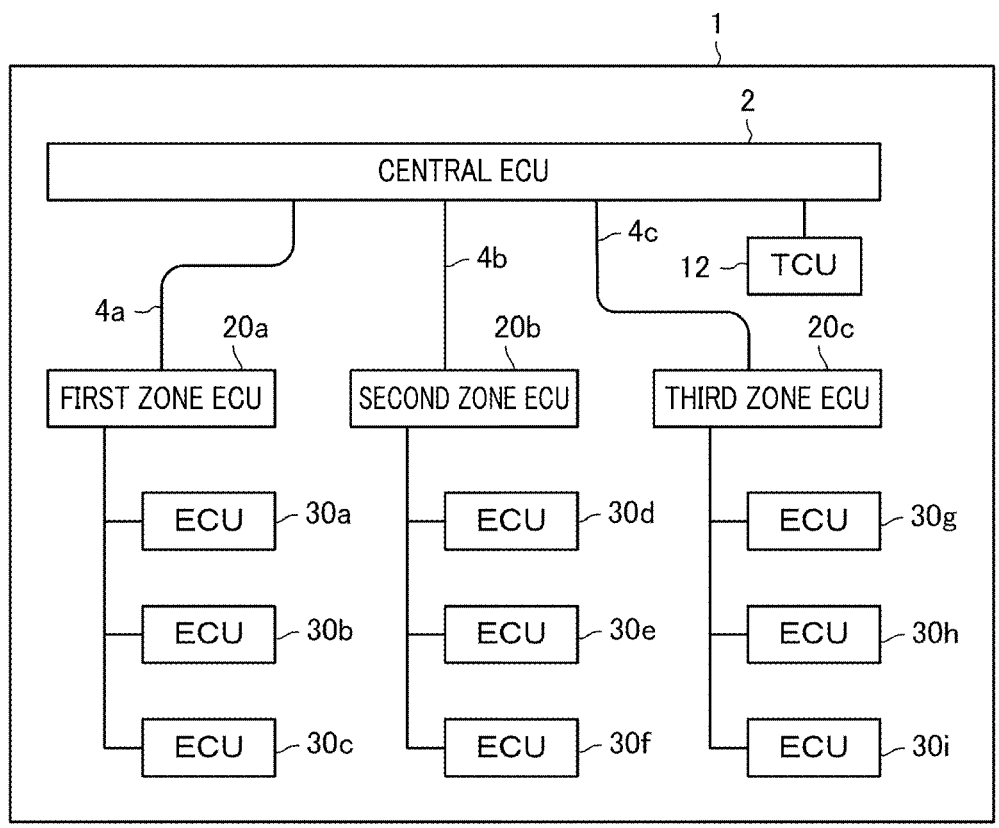
FIG. 1 is a schematic configuration diagram of a control system for a vehicle.

FIG. 1 is a diagram showing a control system 1 for a vehicle.

The control system 1 includes a central ECU 2 that provides general control and information processing of a vehicle. Hereinafter, the vehicle mounted with the control system 1 is defined as an own vehicle. The own vehicle is specifically a vehicle V described later. The central ECU 2 is connected to communication lines including communication lines 4a, 4b and 4c. The central ECU 2 implements the function of a gateway to manage transfer of communication data among these communication lines. The central ECU 2 is connected to a telematics control unit (TCU) 12, which is a wireless device in compliance with communication standards of mobile communication systems. The central ECU 2 uses the TCU 12 to execute over the air (OTA) management. The OTA management includes control on processing of downloading update programs of in-vehicle devices included in the vehicle from a server outside the vehicle, and processing of applying the downloaded update programs to the in-vehicle devices.

The communication lines 4a, 4b, and 4c are connected to a first zone ECU 20a, a second zone ECU 20b, and a third zone ECU 20c, respectively. The first zone ECU 20a is connected to ECUs 30a, 30b, and 30c, and the second zone ECU 20b is connected to ECUs 30d, 30e, and 30f. The third zone ECU 20c is connected to ECUs 30g, 30h, and 30i.

Hereinafter, the first zone ECU 20a, the second zone ECU 20b, and the third zone ECU 20c are also collectively referred to as zone ECUs 20, and the ECUs 30a, 30b, 30c, 30d, 30e, 30f, 30g, 30h, and 30i are also collectively referred to as ECUs 30.

The ECUs 30 can include, for example, a map positioning unit (MPU), a multi view camera (MVC)-ECU, a parking support (PKS)-ECU, and/or an advanced driver-assistance system (ADAS)-ECU, and other ECUs that control the operation of various devices and sensors included in the own vehicle. Such devices and sensors may include a driving motor that causes the own vehicle to travel, maneuvering devices such as an accelerator and a brake, a vehicle stability assist (VSA) device, batteries, lamp bodies such as headlamps, window motors to drive door windows, actuators to drive door locking mechanisms, door lock sensors, door open/close sensors, temperature sensors, exterior cameras, interior cameras, etc.

The zones ECU 20 are each connected to a plurality of ECUs 30 provided within an identical section of vehicle body space of the own vehicle, or a plurality of ECUs 30 that control the operation of the devices and the sensors provided in the identical section.

The central ECU 2 may be connected to other control devices and equipment in addition to the zone ECUs 20. Such control devices and equipment may include an infotainment control box (ICB), speakers, a microphone, an instrument panel, steering switches, a global navigation satellite system (GNSS) sensor, a touch panel, etc.

In the present embodiment, the communication lines 4a, 4b, and 4c are each constituted of a CAN bus that performs communication in compliance with CAN communication standards, for example. Hereafter, the communication lines 4a, 4b, and 4c are also collectively referred to as communication lines 4. Here, the communication lines 4 correspond to an in-vehicle network in this disclosure. In addition, the zone ECUs 20 connected to the communication lines 4 correspond to a plurality of electronic control devices in this disclosure.

The zone ECUs 20 connected to the communication lines 4 send out transmission data in a single frame or as a row of a plurality of frames to the communication lines 4 in accordance with the CAN communication standards based on the conventional art. In accordance with the CAN communication standards, each frame to be sent out includes an identification code (ID), and each of the zone ECUs 20, which have received the frame, determines whether or not the frame is destined to itself based on the ID included in the frame.

Figure 2:
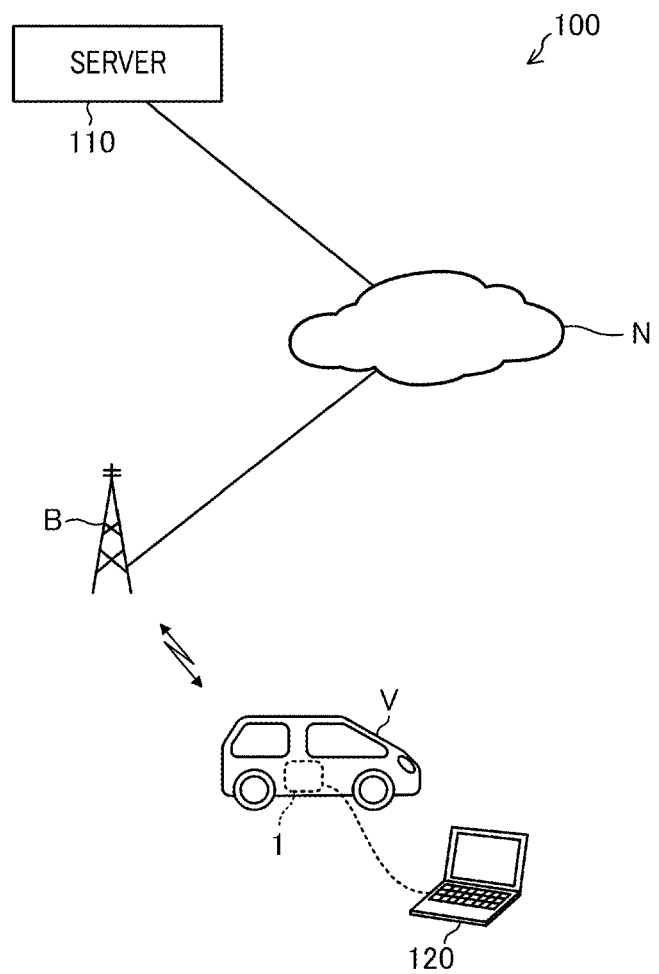
FIG. 2 shows schematic configuration of a program management system.

FIG. 2 shows schematic configuration of a program management system 100. The program management system 100 is a system that enables the update of the programs executed by various ECUs constituting the control system 1. The program management system 100 includes a server 110 and a vehicle diagnostic device 120.

The server 110 is connected to the control system 1 through a communication network N.

The communication network N includes, for example, cellular networks, Wi-Fi (registered trademark) networks, Bluetooth (registered trademark), Internet, wide area networks (WANs), local area networks (LANs), public lines, provider devices, leased lines, base stations, etc. FIG. 2 illustrates a base station B. The TCU 12 included in the control system 1 performs cellular communication with the base station B so as to execute data communication with external devices through the communication network N. The TCU 12 is configured with a computer including a transceiver, a receiver, a microcomputer, and a memory.

By executing communication with the server 110 via the TCU 12, the control system 1 can download from the server 110 the update data to update programs executed by various ECUs in the control system 1. The means for the control system 1 to download the update data from the server 110 and update the programs corresponds to the OTA described above.

The server 110 corresponds to an example of the external device of the control system 1. The server 110 is configured with a server computer. The TCU 12 corresponds to an example of the communication unit.

The vehicle diagnostic device 120 is installed in dealerships and workshops which handle the vehicle V mounted with the control system 1. The vehicle diagnostic device 120 is connected by a cable to an unillustrated data link connector (DLC) included in the control system 1. The control system 1 can perform, for example, update of the programs executed by the control system 1 by communicating with the vehicle diagnostic device 120.

Here, update of the programs of the ECUs refers to rewriting the programs executed by the ECUs to different versions of the programs. The update of the programs of the ECUs may include rewriting, together with the programs, any data referenced when the ECUs execute the programs and/or data generated or modified by execution of the programs. The update of the programs of the ECUs may include rewriting the programs executed by the ECUs to the same versions of the programs.

Figure 3:
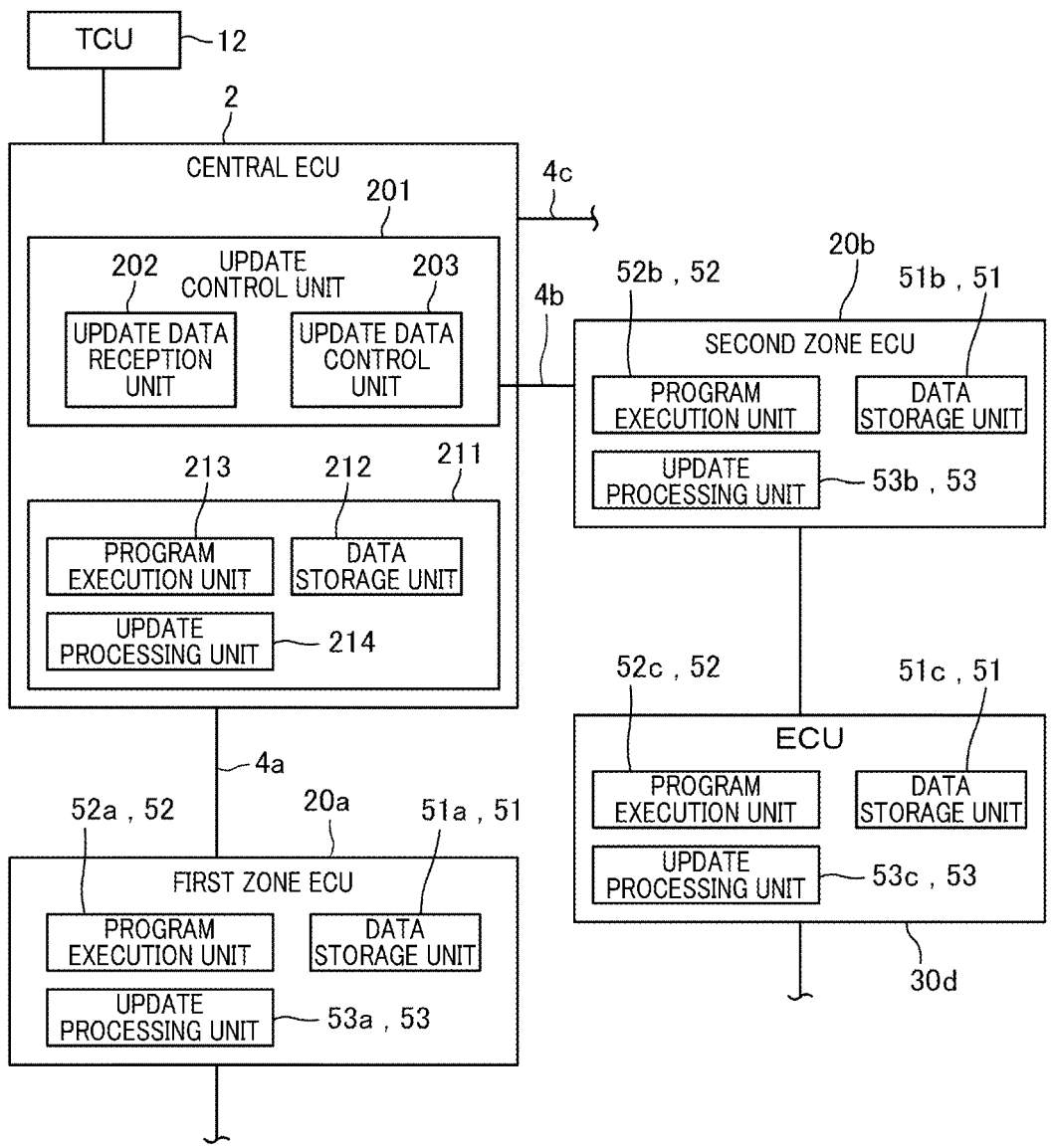
FIG. 3 is a block diagram showing principal part of the control system.

FIG. 3 is a block diagram showing principal part of the configuration of the control system 1. FIG. 3 shows part of the configuration relating to program update in the control system 1, and does not prevent the control system 1 from having the configuration not shown in FIG. 3.

In the control system 1, the ECUs including the central ECU 2, the zone ECUs 20, and the ECUs 30 each include a processor and a storage unit. The processor is constituted of, for example, a central processing unit (CPU), a micro controller unit (MCU), and a micro processor unit (MPU). The storage unit stores programs executed by the processor and data processed by the processor in a non-volatile manner. The storage unit is, for example, a read only memory (ROM). Each of the ECUs may also include a random access memory (RAM) which forms work areas for temporarily storing the programs and the data. Each of the ECUs may also be constituted of an integrated circuit which integrally includes a processor, a ROM and a RAM. Each of the ECUs may also be configured to include a processor, a ROM, and a RAM as independent hardware.

The central ECU 2 includes an update control unit 201, and a processing unit 211 as functional units relating to the program update. The update control unit 201 and the processing unit 211 may be hardware included in the central ECU 2. The update control unit 201 and the processing unit 211 may be functional units implemented through collaboration between software and hardware when the processor of the central ECU 2 executes the programs.

The update control unit 201 includes an update data reception unit 202 and an update data control unit 203. The update data reception unit 202 controls the TCU 12 to receive update data from the server 110 to update the programs. The update data control unit 203 controls processing in which various ECUs including the central ECU 2 update the programs by using update data received by the update data reception unit 202.

FIG. 3 illustrates the central ECU 2, the first zone ECU 20a, the second zone ECU 20b, and the ECU 30d as control targets of the update control unit 201, though this configuration is merely an example. There is no limit to the number of ECUs as the control targets of the update control unit 201. The update control unit 201 controls the update of the programs executed by at least some of the ECUs included in the control system 1. The update control unit 201 may control update of the programs of all the ECUs or almost all the ECUs included in the control system 1.

The processing unit 211 includes a data storage unit 212, a program execution unit 213, and an update processing unit 214. The data storage unit 212 corresponds to the storage unit described before. The data storage unit 212 stores a program executed by the central ECU 2 and data related to the program. The program execution unit 213 executes the program stored in the data storage unit 212. It can also be said that the program execution unit 213 represents the function of a processor itself included in the central ECU 2. The program execution unit 213 corresponds to an example of the vehicle control program execution unit and also corresponds to an example of the irrespective program execution unit. The update processing unit 214 updates the program stored in the data storage unit 212.

The first zone ECU 20a includes a data storage unit 51a, a program execution unit 52a, and an update processing unit 53a. The data storage unit 51a stores programs and data related to the programs. The program execution unit 52a implements the function of the first zone ECU 20a by executing the programs stored in the data storage unit 51a. The update processing unit 53a updates the programs stored in the data storage unit 51a.

The second zone ECU 20b includes a data storage unit 51b, a program execution unit 52b, and an update processing unit 53b. The data storage unit 51b stores programs and data related to the programs. The program execution unit 52b implements the function of the second zone ECU 20b by executing the programs stored in the data storage unit 51b. The update processing unit 53b updates the programs stored in the data storage unit 51b.

Specific examples of the ECU 30d may include an entry ECU. The entry ECU is connected to a LF/RF antenna (not illustrated) which provides wireless communication with an electronic key of the own vehicle. The electronic key, which is an electronic device having a wireless communication function, is referred to as a smart key or a FOB key. In collaboration with other in-vehicle ECUs, the entry ECU processes user access to the control system 1 from the outside of the vehicle, and implements the operation of a so-called smart entry.

The ECU 30d includes a data storage unit 51c, a program execution unit 52c, and an update processing unit 53c. The data storage unit 51c stores programs and data related to the programs. The program execution unit 52c implements the function of the ECU 30d by executing the programs stored in the data storage unit 51c. The update processing unit 53c updates the programs stored in the data storage unit 51c.

Here, when the data storage units 51a, 51b, and 51c are not distinguished, they are stated as data storage units 51. The data storage units 51 may include, in addition to the data storage units 51a, 51b, and 51c, other data storage units included in ECUs not shown in FIG. 3. Similarly, when the program execution units 52a, 52b, and 52c are not distinguished, they are stated as program execution units 52. The program execution units 52 may include, in addition to the program execution units 52a, 52b, and 52c, other program execution units included in ECUs not shown in FIG. 3. Moreover, when the update processing units 53a, 53b, and 53c are not distinguished, they are stated as update processing units 53. The update processing units 53 may include, in addition to the update processing units 53a, 53b, and 53c, other update processing units included in ECUs not shown in FIG. 3. The program execution units 52 correspond to examples of the vehicle control program execution unit and also correspond to examples of the irrespective program execution unit.

Figure 4:
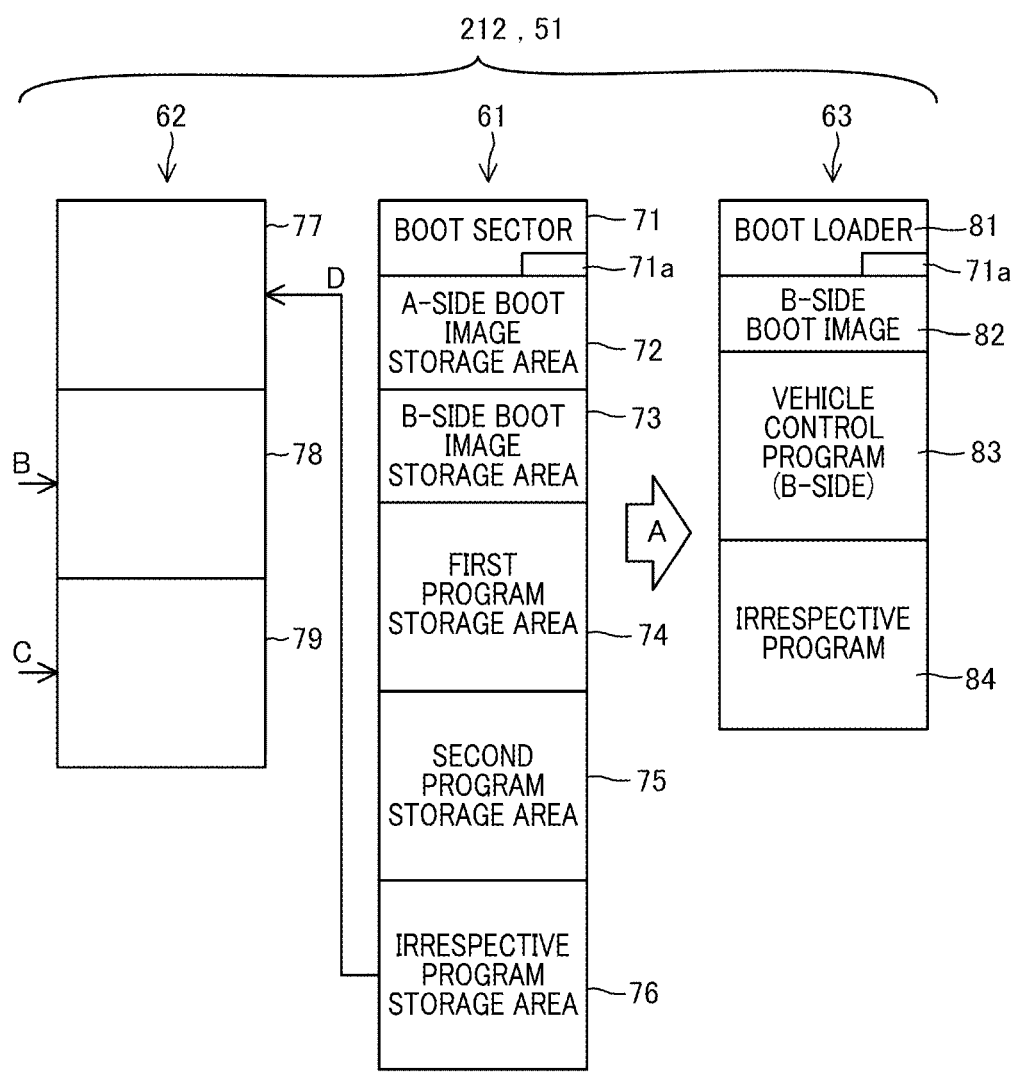
FIG. 4 is a schematic diagram showing a configuration example of a data storage unit.

FIG. 4 is a schematic diagram showing a configuration example of the data storage unit 212. The data storage units 51 may have a similar configuration to the data storage unit 212.

The data storage unit 212 includes a plurality of semiconductor storage elements or semiconductor memory devices. The data storage unit 212 includes a first storage unit 61, a second storage unit 62, and a memory 63. The storage areas of the first storage unit 61, the second storage unit 62, and the memory 63 are independent of each other.

The first storage unit 61 is a storage element that stores programs and data in a non-volatile manner. The first storage unit 61 is, for example, a NOR flash memory element. The second storage unit 62 is a storage element that stores programs and data in the non-volatile manner. The second storage unit 62 is, for example, a NAND flash memory element. The memory 63 is a volatile storage element that stores programs and data. The memory 63 forms a work area when the program execution unit 213 executes the programs. In the work area, the programs executed by the program execution unit 213, and data processed, generated, or updated by the programs are developed. The memory 63 is constituted of, for example, a dynamic random access memory (DRAM), and a synchronous DRAM (SDRAM).

FIG. 4 illustrates an example in which the first storage unit 61, the second storage unit 62, and the memory 63 are each constituted of a single semiconductor storage element. This is merely an example, and one or more of the first storage unit 61, the second storage unit 62, and the memory 63 may be constituted of a plurality of semiconductor storage elements.

In the following description, programs and data stored in the data storage unit 212 and the data storage units 51 are stated as programs. In other words, the programs referred to in the following description include data that is referenced, generated, or processed when the programs are executed by the processor. The programs and data as a whole can be paraphrased as software. Specifically, the program management system 100 has the function of managing and updating the software of the control system 1 mounted on the vehicle V.

As described above, the data storage units 51 are configured in a similar manner to the data storage unit 212. Specifically, the data storage units 51 include the first storage unit 61, the second storage unit 62, and the memory 63.

In the present embodiment, the case where the central ECU 2 uses the data storage unit 212 is described as an example. The use of the data storage unit 51a by the first zone ECU 20a, the use of the data storage unit 51b by the second zone ECU 20b, and the use of the data storage unit 51c by the ECU 30d are executed in a similar manner to the use of the data storage unit 212. The use of the data storage units 51 by other ECUs is also executed in a similar manner.

The storage area included in the first storage unit 61 is divided into a plurality of areas. Specifically, the first storage unit 61 includes a boot sector 71, an A-side boot image storage area 72, a B-side boot image storage area 73, a first program storage area 74, a second program storage area 75, and an irrespective program storage area 76.

The storage area of the first storage unit 61 is classified into an A-side and a B-side. The A-side storage area includes the A-side boot image storage area 72 and the first program storage area 74. The B-side storage area includes the B-side boot image storage area 73 and the second program storage area 75. The boot sector 71 and the irrespective program storage area 76 belong to neither the A-side nor the B-side.

The storage area on the A-side and the storage area on the B-side store programs independently of each other. The program execution unit 213 included in the central ECU 2 can execute various operations that the central ECU 2 is required to perform by using the programs stored in one of the A-side storage area and the B-side storage area. In other words, the central ECU 2 can execute the operation as the central ECU 2 when the programs are successfully stored in one of the A-side and the B-side in the data storage unit 212.

The update processing unit 214 selects one of the A-side and the B-side in the case of updating the programs stored in the data storage unit 212.

As an example, the case where the update processing unit 214 selects the A-side to update a program will be described. In this example, the update processing unit 214 executes the processing of storing a new program to the first program storage area 74, and then executes the processing of confirming that the program is successfully written. Here, when the writing of the program to the first program storage area 74 fails, the update processing unit 214 needs to retry the update of the program. The central ECU 2 is not able to control the vehicle V by executing the programs written in the first program storage area 74 until the program update in the first program storage area 74 is successfully completed. However, the central ECU 2 can control the vehicle V by executing the program stored in the second program storage area 75. The same is true when the update processing unit 214 selects the B-side. In this way, when the data storage unit 212 performs the program update for one side, out of the A-side and the B-side, the other side has executable program stored therein, and therefore the success or failure of the program update does not significantly influence the control of the vehicle V. Therefore, the restriction relating to the timing for the program update is relieved, and it is not impossible to update the program while the vehicle V travels, for example.

The boot sector 71 stores a boot loader. The boot loader is a program that is executed first by the program execution unit 213 when the central ECU 2 is started. The program execution unit 213 executes necessary processing for the basic operation of the central ECU 2 by executing the boot loader. The boot sector 71 stores an active program specification data 71a. The active program specification data 71a is included in the boot loader or stored in an area referenced by the boot loader. The active program specification data 71a is data that specifies the program to be executed by the program execution unit 213 subsequent to the boot loader, and specifies whether the program to be executed is a program on the A-side or a program on the B-side to be specific. For example, the active program specification data 71a is the address of a boot image stored in the A-side boot image storage area 72 or the address of a boot image stored in the B-side boot image storage area 73.

The boot image is a basic control program executed by the processor of the central ECU 2 subsequent to the boot loader. The A-side boot image storage area 72 stores a boot image to be used when the program stored in the first program storage area 70 is executed.

The A-side boot image storage area 72 stores a leading address 72a. The leading address 72a is, for example, a leading address of the program stored in the first program storage area 70. The B-side boot image storage area 73 stores a boot image to be used when the program stored in the second program storage area 75 is executed. The B-side boot image storage area 73 stores a leading address 73a. The leading address 73a is, for example, a leading address of the program stored in the second program storage area 75.

Figure 5:
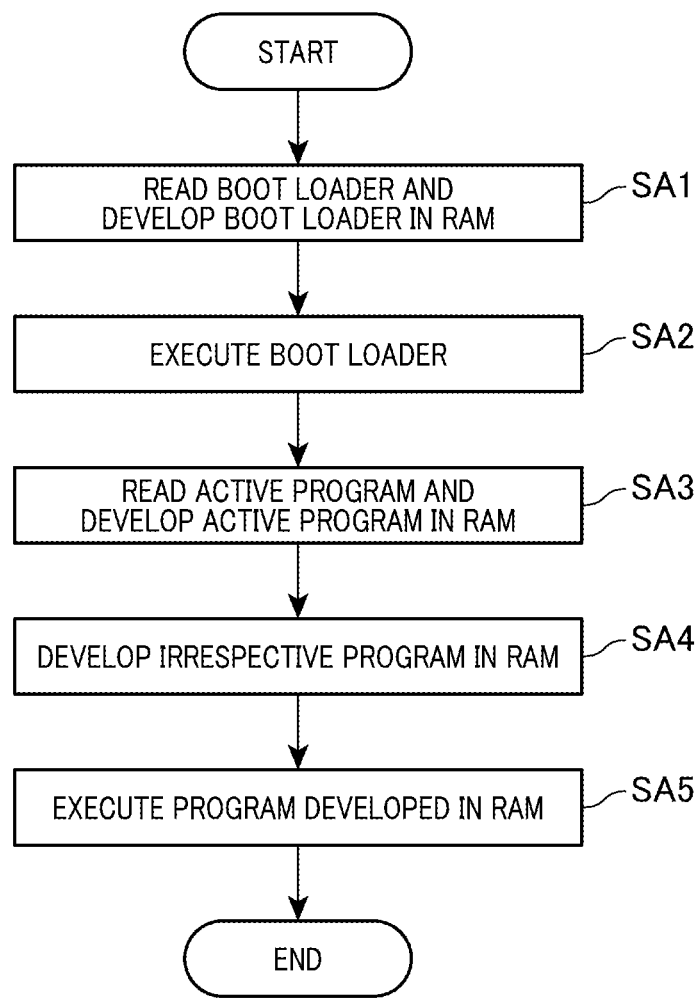
FIG. 5 is a flowchart showing operation of the control system.
Figure 6:
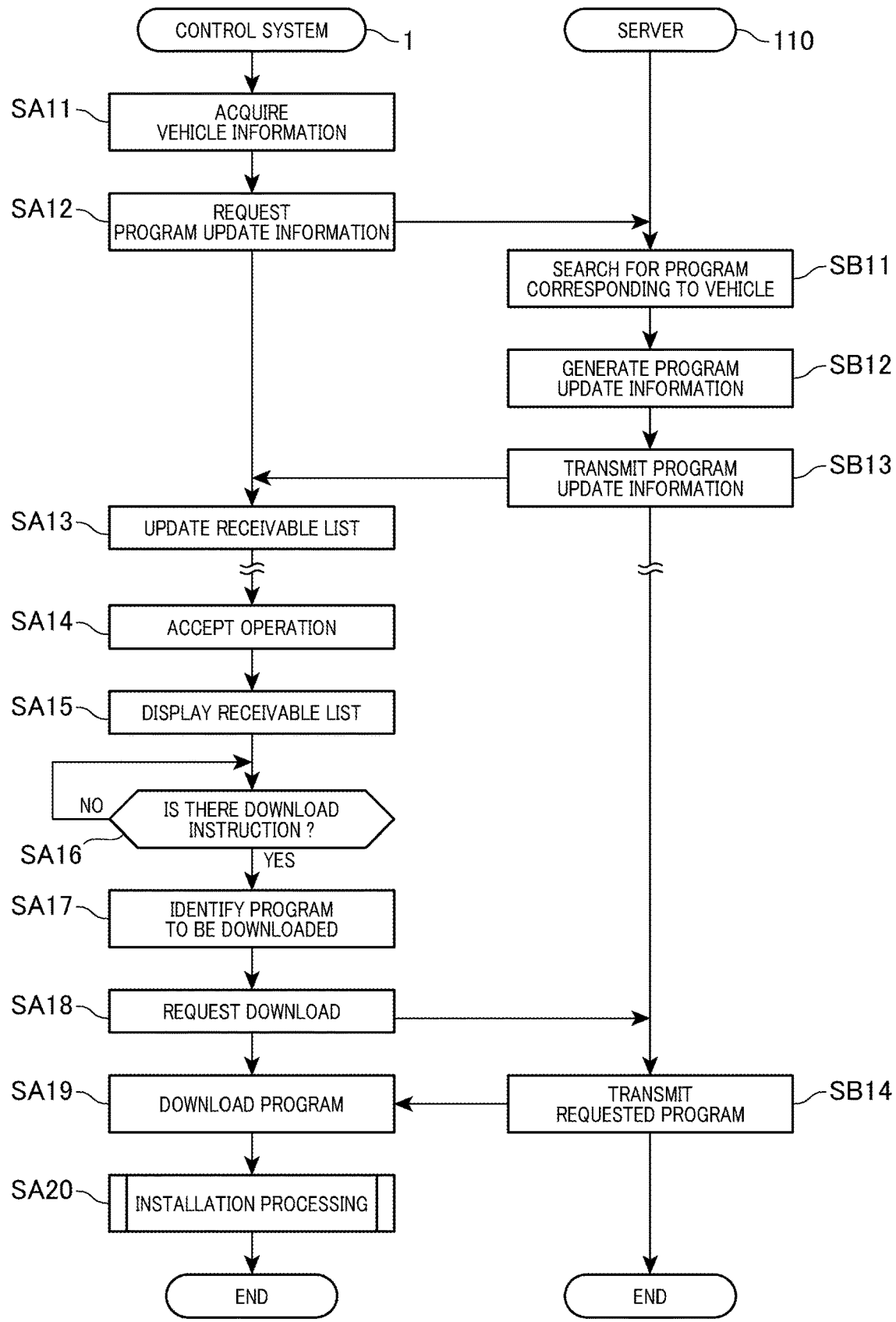
FIG. 6 is a sequence diagram showing operation of the program management system.
Figure 7:
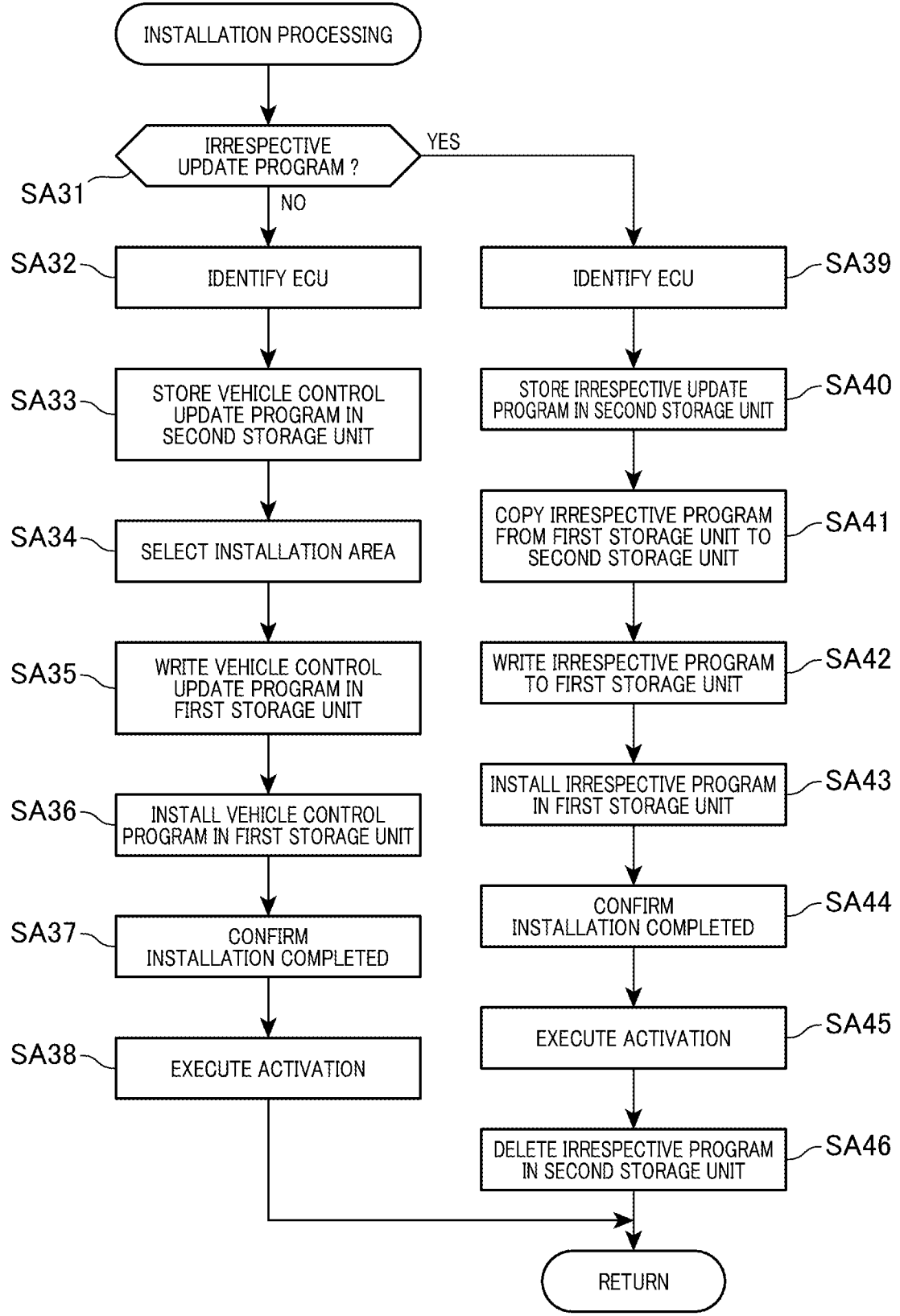
FIG. 7 is a flowchart showing operation of the control system.

The first program storage area 74 is an area for storing programs for the corresponding ECU to control the vehicle V. The second program storage area 75 is an area for storing programs for the corresponding ECU to control the vehicle V. The programs stored in the first program storage area 74 are identical in type or the like to the programs stored in the second program storage area 75. The programs stored in the first program storage area 74 and the second program storage area 75 are programs for controlling the vehicle V. The programs are called vehicle control programs. The vehicle control programs are related to the control relating to travel of the vehicle V and the control required during the travel of the vehicle V. Main bodies that execute the vehicle control programs are the central ECU 2, the first zone ECU 20a, the second zone ECU 20b, the ECU 30d, and other ECUs. For example, programs causing the central ECU 2 to execute operation described with reference to FIGS. 5 to 7 are included in the vehicle control programs. Therefore, the data storage unit 212 corresponds to an example of the non-transitory computer-readable recording medium in the present invention. Among the programs downloaded by the control system 1 from the server 110, programs and data for updating the vehicle control programs are called vehicle control update programs. The control system 1 having the configuration of storing these programs corresponds to an example of the program management device.

The irrespective program storage area 76 is a storage area for storing programs that are irrespective of the control of the vehicle V. The programs stored in the irrespective program storage area 76 are called irrespective programs. The irrespective programs are irrespective of the control relating to travel of the vehicle V and the control essential in travel of the vehicle V, among the processings executed by the control system 1. Among the programs downloaded by the control system 1 from the server 110, programs and data for updating the irrespective programs are called irrespective update programs.

Here, the control relating to travel of the vehicle V includes control relating to acceleration, deceleration, stopping, and steering of the vehicle V. For example, when the user performs operation for maneuvering or driving the vehicle V, the control relating to travel of the vehicle V includes controlling the vehicle V based on the user operation. In addition, the control relating to travel of the vehicle V includes control to execute the ADAS function or the PKS function without based on the user operation. The essential control during travel of the vehicle V includes control to operate auxiliary machines necessary for the vehicle V to travel. For example, the auxiliary machines include a meter panel, lamp bodies of the vehicle V, a wiper, a window washer, and an air conditioner. The essential control during travel of the vehicle V includes controlling cameras and radar devices to execute the ADAS function and the PKS function.

The irrespective programs stored in the irrespective program storage area 76 include, for example, programs relating to an infotainment function provided by the control system 1. The programs relating to the infotainment function refer to, for example, application programs relating to entertainment. Specifically, examples of the infotainment function may include reproducing music, receiving and outputting radio broadcasts, transmitting and receiving emails, receiving and outputting television broadcasts, searching information using networks such as the Internet, executing video games, and other functions relating to entertainment. The irrespective programs include, for example, programs relating to the functions to place orders or make reservation with external service providers by communicating with servers outside the vehicle V based on the operation of a touch panel mounted on the vehicle V. The external service providers refer to, for example, business operators who provide sales of articles including food and beverages, delivery of articles including food and beverages, car wash service, cleaning service, ticket sales or ticket booking service, and other services.

As the irrespective programs, programs specified by the manufacturer of the vehicle V or the distributor of the vehicle V are stored, for example. The irrespective programs may also be programs not specified by the manufacturer of the vehicle V or the distributor of the vehicle V. For example, the irrespective programs may be so-called third-party programs.

The memory 63 forms a work area when the program execution unit 213 executes a program stored in the first storage unit 61.

In order to execute the program stored in the first storage unit 61, the program execution unit 213 stores and develops, in the memory 63, the program stored in the first storage unit 61 as indicated by an arrow A in FIG. 4. As a result, the boot loader stored in the boot sector 71 and the boot image stored in the A-side boot image storage area 72 or the B-side boot image storage area 73 are stored in the work area of the memory 63. The vehicle control programs stored in the first program storage area 74 or the second program storage area 75, and the irrespective programs stored in the irrespective program storage area 76 are also stored in the work area of the memory 63.

FIG. 4 shows examples of the programs stored in the memory 63, when the program execution unit 213 executes a program stored on the B side of the first storage unit 61. In this example, stored in the work area of the memory 63 are a boot loader 81, a B-side boot image 82, a vehicle control program 83 read from the second program storage area 75, and an irrespective program 84. These programs are developed into the state executable by the program execution unit 213 in the work area of the memory 63.

The program execution unit 213 develops, in the memory 63, the program specified by the active program specification data 71a, out of the programs stored on the A-side of the first storage unit 61 and the programs stored on the B-side of the first storage unit 61. The program specified by the active program specification data 71a is called an active program.

The storage area of the second storage unit 62 is divided into a plurality of areas. Specifically, the second storage unit 62 includes a program storage area 77, a first update program storage area 78, and a second update program storage area 79.

The first update program storage area 78 and the second update program storage area 79 are storage areas for storing update programs downloaded by the control system 1 from the server 110. The first update program storage area 78 stores vehicle control update programs to update the vehicle control programs. The second update program storage area 79 stores irrespective update programs to update the irrespective programs. The update processing unit 214 stores the vehicle control update programs downloaded from the server 110 in the first update program storage area 78 as indicated by an arrow B, and stores the irrespective update programs in the second update program storage area 79 as indicated by an arrow C.

The program storage area 77 stores the irrespective programs stored in the irrespective program storage area 76. More specifically, when updating an irrespective program stored in the irrespective program storage area 76, the update processing unit 214 copies and stores the irrespective program before update in the program storage area 77. Accordingly, the irrespective program before update is stored in the program storage area 77. The program execution unit 213 can write the irrespective update program stored in the program storage area 77 back to the irrespective program storage area 76 in the first storage unit 61. For example, when update of the irrespective program stored in the irrespective program storage area 76 is not successfully completed, the program execution unit 213 writes the irrespective program stored in the program storage area 77 back to the irrespective program storage area 76. As a result, regardless of the success or failure of the update of the irrespective program, the irrespective program storage area 76 can hold the irrespective program that can be executed normally.

FIG. 5 is a flowchart showing the operation of the control system 1, in which the program execution unit 213 executes the programs stored in the data storage units 51 and 212. The operation in FIG. 5 is executed when the corresponding ECU is started. As an example, the case where the central ECU 2 executes a program stored in the data storage unit 212 is described.

When the central ECU 2 is started from a stopped state, the program execution unit 213 of the central ECU 2 reads the boot loader 81 stored in the boot sector 71 of the first storage unit 61, and develops the boot loader 81 in the work area of the memory 63 (step SA1). The program execution unit 213 executes the boot loader 81 developed in the memory 63 (step SA2). In step SA2, the program execution unit 213 determines whether an active program is on the A-side or the B-side by referencing the active program specification data 71a included in the boot loader 81.

The program execution unit 213 reads from the first storage unit 61 an active program specified by the active program specification data 71a, and develops the active program in the work area of the memory 63 (step SA3). For example, when the active program is a B-side program, the program execution unit 213 develops, in the memory 63, the B-side boot image 82 stored in the B-side boot image storage area 73 and the vehicle control program 83 stored in the second program storage area 75.

The program execution unit 213 further develops the irrespective program 84 stored in the irrespective program storage area 76 in the work area of the memory 63 (step SA4).

The program execution unit 213 implements the function of the central ECU 2 by executing the programs developed in the first storage unit 61.

In the operation example of FIG. 5, the timing for developing the irrespective program 84 in the first storage unit 61 is not limited to the start time of the ECU. For example, when the user instructs execution of a irrespective program by operating the touch panel mounted on the vehicle V, the program execution unit 213 may read the irrespective program 84 from the irrespective program storage area 76 and develop the irrespective program 84 in the first storage unit 61.

FIG. 6 is a sequence diagram showing operation of the program management system 100.

Steps SA11 to SA20 indicate the operation of the control system 1, and steps SB11 to SB14 indicate the operation of the server 110. FIG. 7 is a flowchart showing the details of the operation of the control system 1 in step SA20 of FIG. 6.

FIGS. 6 and 7 show the processing relating to the operation of updating the programs of the control system 1.

In FIG. 6, the update data reception unit 202 executes steps SA11 to SA19. The control system 1 acquires vehicle information on the vehicle V (step SA11). The vehicle information is used by the server 110 to identify the types of programs and the versions of the programs compatible with the control system 1. The vehicle information includes, for example, a vehicle identification number of the vehicle V, the types of ECUs included in the control system 1, and the versions of the programs mounted on the ECUs.

The control system 1 acquires information held by the control system 1 and information held by the ECUs connected to the control system 1, and aggregates these information pieces into a single set of vehicle information.

The control system 1 requests program update information from the server 110 (step SA12). The program update information relates to the programs already stored in the control system 1. Specifically, the program update information includes the names and the versions of programs which can be updated, among the programs already stored in the control system 1. The program update information may also include information about the programs which can be used by the control system 1 and which are not stored in the control system 1. In this case, the program update information includes the names of the programs usable in the control system 1 and information indicating the outline of the programs. In step SA12, the control system 1 transmits the vehicle information acquired in step SA11 to the server 110 when requesting the program update information. The server 110 receives the request for the program update information and the vehicle information on the vehicle V.

Based on the request transmitted from the control system 1 and the vehicle information on the vehicle V, the server 110 searches for the programs corresponding to the vehicle V in a database not shown (step SB11). The server 110 stores the programs corresponding to a plurality of vehicles, including the vehicle V, in the database. The database may be included in the server 110, or may be a database server connected to the server 110 via the communication network N.

The server 110 generates program update information based on the result of database search (step SB12), and transmits the program update information to the control system 1 (step SB13). The control system 1 receives the program update information.

The control system 1 updates a receivable list based on the program update information received from the server 110 (step SA13). The receivable list is a list of programs that the control system 1 can download from the server 110. The receivable list includes programs updatable, among the programs stored in the control system 1, and programs usable by the control system 1 and not stored in the control system 1. The receivable list includes the names of the programs and the types or the outline of the programs.

The control system 1 and the server 110 repeatedly execute the operation of steps SA11 to SA13 and steps SB11 to SB13 at pre-set cycles. This allows the control system 1 to maintain a state of holding an up-to-date receivable list about the programs corresponding to the vehicle V.

The program update in the control system 1 is started when, for example, the user operates the touch panel or the like mounted on the vehicle V. When the user performs operation relating to the program update, the control system 1 accepts the user operation (step SA14). The control system 1 responds to the user operation by displaying the receivable list on, for example, a display mounted on the vehicle V (step SA15). In this point, the control system 1 determines whether or not the user has instructed to download the program (step SA16). For example, the user operates the touch panel mounted on the Vehicle V to select a program to download and instruct the download of the selected program. During a period of time when the program download is not instructed (NO in step SA16), the control system 1 waits in step SA16.

When the program download is instructed (YES in step SA16), the control system 1 identifies the program to be downloaded based on the user instruction (step SA17). The control system 1 requests the server 110 to download the identified program (step SA18). The server 110 receives the download request made by the control system 1.

The server 110 transmits the program requested by the control system 1 to the control system 1 (step SB14). The program transmitted by the server 110 includes at least one of a vehicle control update program for updating a vehicle control program or installing a new vehicle control program and a non-control update program for updating an irrespective program or installing a new irrespective program. The control system 1 downloads the program transmitted by the server 110 (step SA19). The control system 1 then executes installation processing (step SA20). The installation processing includes storing the program downloaded in step SA19 in the corresponding data storage unit 51 or the data storage unit 212. The installation processing also includes processing of executing the vehicle control update program and/or the non-control update program to put the vehicle control program and/or the irrespective program in a state executable by the corresponding ECU. After installation, the program is stored in the corresponding data storage unit 51 or the data storage unit 212 in the state executable by the corresponding ECU.

FIG. 7 shows the details of the installation processing. In FIG. 7, steps SA31, SA32, and SA39 are executed by the update data control unit 203, and other operations are executed by the update processing unit 214 or the update processing units 53. In the following description, the case where the update processing unit 214 executes the first processing and the second processing is taken as an example. However, the update processing units 53 can also execute similar operation.

The update data control unit 203 determines whether or not a program to be installed is the irrespective update program (step SA31). When the program to be installed is not the irrespective update program (NO in step SA31), the update data control unit 203 identifies the ECU to be subject to installation of the program (step SA32). In step SA32, the update data control unit 203 selects the ECU which installs the program, out of the central ECU 2, the first zone ECU 20a, the second zone ECU 20b, the ECU 30d, and other ECUs. Next, the update processing unit 214, which is included in the ECU identified by the update data control unit 203, stores the vehicle control update program downloaded by the TCU 12 in the first update program storage area 78 of the second storage unit 62 (step SA33).

The update processing unit 214 selects one of the A-side and the B side of the first storage unit 61 as an installation area of the vehicle control program (step SA34). Specifically, the update processing unit 214 selects one of the first program storage area 74 and the second program storage area 75 as the installation area. When the program stored in the first program storage area 74 is identical in type and version to the program stored in the second program storage area 75, the update processing unit 214 selects one of the A-side and the B-side based on previous setting. When the program stored in one of the first program storage area 74 and the second program storage area 75 is defective, the update processing unit 214 selects the area where the defective program is stored in step SA34. When the program stored in the first program storage area 74 is different in version from the program stored in the second program storage area 75, the update processing unit 214 selects the area where the program of the older version is stored in step SA34.

The update processing unit 214 writes, to the area selected in step SA34, the vehicle control update program stored in the first update program storage area 78 (step SA35). The update processing unit 214 then installs the vehicle control update program by causing the program execution unit 213 to execute the vehicle control update program written in step SA35 (step SA36).

The update processing unit 214 performs processing to confirm that the installation is successfully completed (step SA37). In step SA37, the update processing unit 214 confirms that the installed program is in the state normally executable by the program execution unit 213.

For example, the update processing unit 214 confirms the normality of the program and data written to the first storage unit 61 by calculating and comparing hash values or calculating and comparing checksums.

The update processing unit 214 executes activation of the installed program (step SA38). Activation is processing to set so that the control system 1 executes the installed program. For example, the update processing unit 214 performs processing of rewriting the active program specification data 71*a* to the address of the area selected in step SA34.

Meanwhile, when the program to be installed is the irrespective update program (YES in step SA31), the update data control unit 203 identifies the ECU to be subject to installation of the program (step SA39). The operation of step SA39 is similar to that of step SA32.

Next, the update processing unit 214 included in the ECU identified by the update data control unit 203 stores the irrespective update program downloaded by the TCU 12 in the second update program storage area 79 of the second storage unit 62 (step SA40).

The update processing unit 214 copies the irrespective program stored in the irrespective program storage area 76 to the program storage area 77 in the second storage unit 62 (step SA41). The update processing unit 214 then writes the irrespective update program stored in the second update program storage area 79 to the irrespective program storage area 76 (step SA42).

The update processing unit 214 installs the irrespective program in the irrespective program storage area 76 by causing the program execution unit 213 to execute the irrespective update program written in step SA42 (step SA43).

The update processing unit 214 performs processing to confirm that the installation is successfully completed (step SA44). In step SA44, the update processing unit 214 performs similar processing to that in step SA37. The update processing unit 214 executes activation of the installed program (step SA45).

The update processing unit 214 deletes the irrespective program stored in the program storage area 77 of the second storage unit 62 (step SA46).

The above embodiment shows a specific example in which the present invention is applied, and does not intend to limit the form of application of the present invention.

For example, in the above embodiment, the configuration has been described in which the vehicle control update programs or irrespective update programs are downloaded from the server 110 to the control system 1 by the user operating the touch panel or the like. This configuration is merely an example, and the control system 1 may be configured to download vehicle control update programs from the server 110 without requiring user operation, for example. The control system 1 may also be configured to download irrespective update programs from the server 110 without requiring user operation. In these cases, the control system 1 may be configured to install downloaded vehicle control update programs and/or irrespective update programs based on user operation. In addition, the control system 1 may install the vehicle control update programs without any user operation.

In the above embodiment, an example of the control system 1 operating as a program management device has been described. Specifically, the control system 1 includes the data storage units 51 and 213 that store the vehicle control programs and the irrespective programs, and manages update of the vehicle control programs and the irrespective programs. This configuration is merely an example, and the program management device may be configured as part of the control system 1, and an external device connected to the control system 1 may be configured to function as the program management device, for example.

The configuration of the control system 1 shown in the above embodiment is also merely an example, and the types of the ECUs included in the control system 1, the number of the ECUs, and the configuration of the devices to be controlled by the ECUs can be changed in various ways.

FIGS. 1 and 3 are schematic configuration diagrams showing the functional configuration of respective devices of the program management system 100, the functional configuration being divided according to main processing contents for easy understanding of the present invention. Therefore, FIGS. 1 and 3 do not limit the configuration of the devices. Each processing shown in FIGS. 5 to 7 may be executed by a single program or may be executed by a plurality of programs.

The embodiment disclosed supports the following configuration.

(Configuration 1) A program management device, including:
  a communication unit that communicates with an external device that is present outside a vehicle; a first storage unit having an irrespective program storage area where an irrespective program that is irrespective of control of the vehicle is stored; a second storage unit provided independently of the first storage unit; and an update processing unit configured to store in the second storage unit an irrespective update program received by the communication unit, the irrespective update program being used to update the irrespective program, in which the update processing unit executes processing of storing, in the second storage unit, the irrespective program stored in the irrespective program storage area, and subsequently executes processing of storing the irrespective program in the irrespective program storage area based on the irrespective update program.

According to the program management device in configuration 1, the irrespective program is stored in the second storage unit before updating the irrespective program stored in the first storage unit. As a result, the irrespective program before update can be held in the second storage unit. Therefore, even when the update of the irrespective program is not successfully completed, the irrespective program in the first storage unit can be rolled back using the irrespective program stored in the second storage unit. Therefore, since the reliability of the program is not compromised without restricting the timing for executing the processing of updating the irrespective program, it is possible to reduce the restriction of the timing for updating the irrespective program.

(Configuration 2) The program management device according to configuration 1, in which the first storage unit includes a first program storage area where a vehicle control program for controlling the vehicle is stored and a second program storage area where the vehicle control program is stored, the update processing unit stores in the second storage unit a vehicle control update program received by the communication unit, the vehicle control update program being used to update the vehicle control program, and the update processing unit updates one of the vehicle control program stored in the first program storage area and the vehicle control program stored in the second program storage area, based on the vehicle control update program stored in the second storage unit.

According to the program management device in the configuration 2, the vehicle control program for controlling the vehicle is stored in the first program storage area and the second program storage area. This allows the vehicle control program to be held in an area that is not affected by the update, while the vehicle control program is updated. Therefore, the reliability of the vehicle control program is not compromised without restricting the timing for updating the vehicle control program. This makes it possible to reduce the restriction of timing for updating the vehicle control program.

(Configuration 3) The program management device according to configuration 2, in which the update processing unit includes a vehicle control program execution unit that executes the vehicle control program set as an active program, out of the vehicle control program stored in the first program storage area and the vehicle control program stored in the second program storage area, and the update processing unit sets the updated vehicle control program as an the active program, when the vehicle control program stored in the first program storage area or the vehicle control program stored in the second program storage area is updated.

According to the program management device in configuration 3, it is possible to set the program to be executed, out of the vehicle control programs stored in the first program storage area and the second program storage area. This allows efficient use of the vehicle control programs stored in the duplicated storage areas.

(Configuration 4) The program management device according to any one of configurations 1 to 3, including an irrespective program execution unit configured to execute the irrespective program, in which the update processing unit executes the processing of storing the irrespective program in the irrespective program storage area based on the irrespective update program, regardless of whether or not the irrespective program execution unit is executing the irrespective program.

According to the program management device in configuration 4, the irrespective program is stored in the second storage unit before the processing of updating the irrespective program, so that the processing of updating the irrespective program does not cause loss of the irrespective program before the update. Therefore, efficient program update is achieved by allowing execution of update of the irrespective program, regardless of whether the irrespective program is being executed or not.

(Configuration 5) The program management device according to any one of configurations 1 to 4, in which the update processing unit deletes the irrespective program stored in the second storage unit after executing the processing of storing the irrespective program in the irrespective program storage area based on the irrespective update program.

In the processing of updating the irrespective program, the program management device in configuration 5 deletes the irrespective program held in the second storage unit, when the irrespective program is no longer needed. As a result, the storage area of the second storage unit can be used efficiently.

(Configuration 6) The program management device according to any one of configurations 1 to 5, in which the update processing unit writes the irrespective program stored in the second storage unit in the irrespective program storage area, when the processing of storing the irrespective program in the irrespective program storage area based on the irrespective update program is not successfully completed.

According to the program management device in configuration 6, when the update of the irrespective program in the first storage unit is not successfully completed, the irrespective program can be rolled back using the irrespective program before the update. This makes it possible to ensure the reliability regarding the update of the irrespective program.

(Configuration 7) The program management device according to any one of configurations 1 to 6, in which the first storage unit is constituted of a NOR flash memory element, and the second storage unit is constituted of a NAND flash memory element.

According to the program management device in configuration 7, the vehicle control program and the irrespective program are stored using the NOR flash memory element with high data holding performance, so that the reliability of the programs used in the vehicle can be enhanced. The NOR flash memory is suitable for storing programs because of high random read speed. In addition, high reliability can be secured for the vehicle control programs by duplicating and storing the vehicle control program in the first storage unit that is the NOR flash memory element. In updating the irrespective program, the low-cost NAND flash memory element is used as the second storage unit that is used for holding the irrespective program before update. This makes it possible to ensure the reliability regarding the update of the irrespective program at a small cost.

(Configuration 8) A program management method, using a program management device including a communication unit that communicates with an external device present outside a vehicle, a first storage unit, and a second storage unit, the method including: providing the first storage unit with an irrespective program storage area where an irrespective program that is irrespective of control of the vehicle is stored; storing in the second storage unit an irrespective update program received by the communication unit, the irrespective update program being used to update the irrespective program; executing processing of storing the irrespective program stored in the irrespective program storage area in the second storage unit; and subsequently executing processing of storing the irrespective program in the irrespective program storage area based on the irrespective update program.

According to the program management method in configuration 8, the irrespective program is stored in the second storage unit before updating the irrespective program stored in the first storage unit. As a result, the irrespective program before update can be held in the second storage unit. Therefore, even when update of the irrespective program is not successfully completed, the irrespective program in the first storage unit can be rolled back using the irrespective program stored in the second storage unit. Therefore, since the reliability of the program is not compromised without restricting the timing for executing the processing of updating the irrespective program, the restriction of the timing for updating the irrespective program can be reduced.

(Configuration 9) A non-transitory computer-readable recording medium storing a program executed by a computer that controls a program management device, the program management device including a communication unit that communicates with an external device present outside a vehicle, a first storage unit, and a second storage unit, wherein the first storage unit is provided with an irrespective program storage area where an irrespective program that is irrespective of control of the vehicle is stored, and the program causes the computer to execute: storing in the second storage unit an irrespective update program received by the communication unit, the irrespective update program being used to update the irrespective program; executing processing of storing the irrespective program stored in the irrespective program storage area in the second storage unit; and subsequently executes processing of storing the irrespective program in the irrespective program storage area based on the irrespective update program.

According to the program in configuration 9, the irrespective program is stored in the second storage unit before updating the irrespective program stored in the first storage unit. As a result, the irrespective program before update can be held in the second storage unit. Therefore, even when update of the irrespective program is not successfully completed, the irrespective program in the first storage unit can be rolled back using the irrespective program stored in the second storage unit. Therefore, since the reliability of the program is not compromised without restricting the timing for executing the processing of updating the irrespective program, the restriction of the timing for updating the irrespective program can be reduced.

1 . . . Control system (program management device), 2 . . . Central ECU, 12 TCU (communication unit), 20 . . . Zone ECU (control unit), 20a . . . . First zone ECU (control unit), 20b . . . Second zone ECU (control unit), 20C . . . Third zone ECU (control unit), 30, 30a, 30b, 30c, 30d, 30e, 30f, 30g, 30h, 30i . . . ECU, 51, 51a, 51b, 51c, 212 . . . Data storage unit, 52, 52a, 52b, 52c, 213 . . . Program execution unit (vehicle control program execution unit, irrespective program execution unit), 53, 53a, 53b, 53c, 214 . . . Update processing unit, 61 . . . first storage unit, 62 . . . Second storage unit, 63 . . . Memory, 74 . . . First program storage area, 75 . . . Second program storage area, 76 . . . Irrespective program storage area, 77 . . . Program storage area, 78 . . . First update program storage area, 79 . . . Second update program storage area, 100 . . . Program management system, 110 . . . Server, 120 . . . Vehicle diagnostic device, 201 . . . Update control unit, 202 . . . Update data reception unit, 203 . . . Update data control unit, 211 . . . Processing unit, V . . . Vehicle.

What is claimed is:

1. A program management device, comprising:
    a communication unit that is a transceiver configured to communicate with an external device that is present outside a vehicle;
    a first storage unit having a first program storage area where a vehicle control program for controlling the vehicle is stored and a second program storage area where the vehicle control program for controlling the vehicle is stored and an irrespective program storage area where an irrespective program that is irrespective of control of the vehicle is stored;
    a processor, wherein the processor includes:
        a vehicle control program execution unit that executes the vehicle control program set as an active program, out of the vehicle control program stored in the first program storage area or the second program storage area; and
        an irrespective program execution unit configured to execute the irrespective program stored in the irrespective program storage area; and
    a second storage unit that is provided independently of the first storage unit and that includes a first update program storage area and a second update program storage area, the first update program storage area storing a vehicle control update program received by the communication unit, the vehicle control update program being used to update the vehicle control program, the second update program storage area storing an irrespective update program received by the communication unit, the irrespective update program being used to update the irrespective program,
    wherein
    the processor further includes an update processing unit configured to execute update processing of the vehicle control program based on the vehicle control update program and update processing of the irrespective program based on the irrespective update program, wherein
        when a program for updating is received by the communication unit, the update processing unit determines whether or not the program for updating is the vehicle control update program or the irrespective update program,
        when the program for updating is the vehicle control update program, the update processing unit executes processing of updating the vehicle control program stored in the first program storage area or the second program storage area of the first storage unit, based on the vehicle control update program stored in the first update program storage area, and
        when the program for updating is the irrespective update program, the update processing unit executes processing of: storing, in a program storage area provided with the second storage unit, a copy of the irrespective program stored in the irrespective program storage area of the first storage unit; and subsequently updating the irrespective program stored in the irrespective program storage area of the first storage unit, based on the irrespective update program stored in the second update program storage area of the second storage unit.

2. The program management device according to claim 1, wherein
    the update processing unit sets the updated vehicle control program as an active program, when the vehicle control program stored in the first program storage area or the vehicle control program stored in the second program storage area is updated.

3. The program management device according to claim 1, wherein
    the update processing unit executes the processing of updating the irrespective program stored in the irrespective program storage area of the first storage unit based on the irrespective update program, regardless of whether or not the irrespective program execution unit is executing the irrespective program.

4. The program management device according to claim 1, wherein the update processing unit deletes the irrespective program stored in the program storage area of the second storage unit after executing the processing of updating the irrespective program stored in the irrespective program storage area of the first storage unit based on the irrespective update program.

5. The program management device according to claim 1, wherein the update processing unit writes the irrespective program stored in the program storage area of the second storage unit in the irrespective program storage area of the first storage unit, when the processing of updating the irrespective program stored in the irrespective program storage area of the first storage unit based on the irrespective update program is not successfully completed.

6. The program management device according to claim 1, wherein the first storage unit is constituted of a NOR flash memory element, and the second storage unit is constituted of a NAND flash memory element.

7. A program management method, executed by a program management device including:
a communication unit that communicates with an external device present outside a vehicle;
a first storage unit having a first program storage area where a vehicle control program for controlling the vehicle is stored and a second program storage area where the vehicle control program for controlling the vehicle is stored, and an irrespective program storage area where an irrespective program that is irrespective of control of the vehicle is stored; and
a second storage unit that is provided independently of the first storage unit and that includes a first update program storage area and a second update program storage area, the first update program storage area storing a vehicle control update program received by the communication unit, the vehicle control update program being used to update the vehicle control program, the second update program storage area storing an irrespective update program received by the communication unit, the irrespective update program being used to update the irrespective program,
the method comprising:
executing the vehicle control program set as an active program, out of the vehicle control program stored in the first program storage area or the second program storage area;
executing the irrespective program stored in the irrespective program storage area; and
executing update processing of the vehicle control program based on the vehicle control update program and update processing of the irrespective program based on the irrespective update program,
wherein the update processing further comprises:
when a program for updating is received by the communication unit determining whether or not the program for updating is the vehicle control update program or the irrespective update program,
when the program for updating is the vehicle control update program, executing processing of updating the vehicle control program stored in the first program storage area or the second program storage area of the first storage unit, based on the vehicle control update program stored in the first update program storage area, and
when the program for updating is the irrespective update program, executing processing of: storing, in a program storage area provided with the second storage unit, a copy of the irrespective program stored in the irrespective program storage area of the first storage unit; and subsequently updating the irrespective program stored in the irrespective program storage area of the first storage unit, based on the irrespective update program stored in the second update program storage area of the second storage unit.

8. A non-transitory computer-readable recording medium storing a program executed by a computer that controls a program management device, the program management device including:
a communication unit that communicates with an external device present outside a vehicle;
a first storage unit having a first program storage area where a vehicle control program for controlling the vehicle is stored and a second program storage area where the vehicle control program for controlling the vehicle is stored, and an irrespective program storage area where an irrespective program that is irrespective of control of the vehicle is stored; and
a second storage unit that is provided independently of the first storage unit and that includes a first update program storage area and a second update program storage area, the first update program storage area storing a vehicle control update program received by the communication unit, the vehicle control update program being used to update the vehicle control program, the second update program storage area storing an irrespective update program received by the communication unit, the irrespective update program being used to update the irrespective program,
wherein the program causes the computer to function as:
a vehicle control program execution unit that executes the vehicle control program set as an active program, out of the vehicle control program stored in the first program storage area or the second program storage area;
an irrespective program execution unit configured to execute the irrespective program stored in the irrespective program storage area; and
an update processing unit configured to execute update processing of the vehicle control program based on the vehicle control update program and update processing of the irrespective program based on the irrespective update program, wherein
when a program for updating is received by the communication unit the update processing unit determines whether or not the program for updating is the vehicle control update program or the irrespective update program,
when the program for updating is the vehicle control update program, the update processing unit executes processing of updating the vehicle control program stored in the first program storage area or the second program storage area of the first storage unit, based on the vehicle control update program stored in the first update program storage area, and when the program for updating is the irrespective update program, the update processing unit executes processing of: storing, in a program storage area provided with the second storage unit, a copy of the irrespective program stored in the irrespective program storage area of the first storage unit; and subsequently updating the irrespective program stored in the irrespective program storage area of the first storage unit, based on the irrespective update program stored in the second update program storage area of the second storage unit.

\* \* \* \* \*